Feb. 7, 1933.                H. C. BOSTWICK                1,896,280
                             COLLAPSIBLE DRUM
                           Filed June 17, 1931           2 Sheets-Sheet 1

Feb. 7, 1933.    H. C. BOSTWICK    1,896,280
COLLAPSIBLE DRUM
Filed June 17, 1931    2 Sheets-Sheet 2

Inventor
H. C. Bostwick,
by Robert M. Pierson,
Attorney

Patented Feb. 7, 1933

1,896,280

UNITED STATES PATENT OFFICE

HENRY C. BOSTWICK, OF AKRON, OHIO, ASSIGNOR TO THE AKRON STANDARD MOLD COMPANY, OF AKRON, OHIO, A CORPORATION OF OHIO

COLLAPSIBLE DRUM

Application filed June 17, 1931. Serial No. 545,056.

This invention relates to collapsible forms or mandrels including drums, cores, chucks and reels such as are employed in various arts for shaping, winding, sizing or putting together an annular or tubular article and subsequently removing the form. In particular, it relates to collapsible drums or formers for use in the manufacture of pneumatic tire bands, especially those which are laid up in flat or semi-flat shape.

My principal objects are to provide a simple and easily operated segmental form which may be collapsed to a smaller size than those heretofore in use, and to furnish a strong and durable device of this type which may be quickly collapsed and expanded. A drum of this character is especially useful in making high-crowned tire bands of relatively small bead diameter.

Of the accompanying drawings, Fig. 1 is a longitudinal section and side elevation of a collapsible tire band drum and adjacent supporting and controlling members embodying my invention in a preferred form, the section being on the line 1—1 of Fig. 2.

Figure 1:
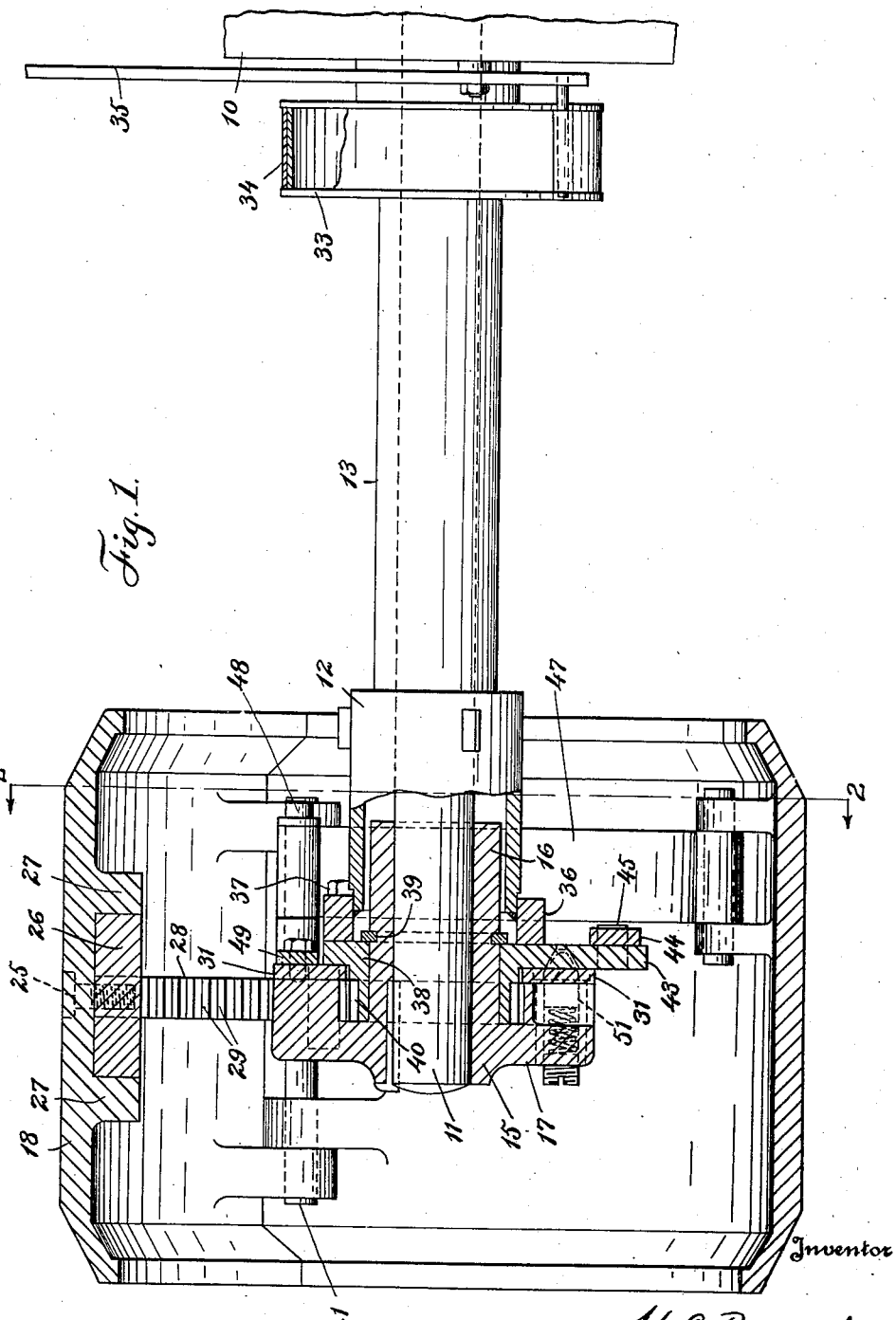

In the drawings, 10 is a portion of the casing of a tire building machine from which projects horizontally a power-driven main shaft 11 surrounded by a hollow control shaft composed of forward and rear sections 12, 13 of which the former may be telescopically adjustable on the latter to accommodate drums of different axial lengths.

Secured by a key 14 to the forward end of shaft 11 is the central supporting member or hub structure 15 of a drum chuck, said member having a sleeve portion 16 surrounding the shaft and a head portion 17 integral with said sleeve portion.

18 is a main drum segment occupying approximately one-third of the circumference of the drum, and 19 and 20 are foldable segments pivotally supported by said main segment at opposite ends of the latter by means of hinge pins 21, 22 extending through ears projecting inwardly from the respective segments. Segment 19 occupies somewhat more and segment 20 somewhat less than one-third of the drum circumference and the two meet in a diagonal joint 23 which is radially aligned by a stop-plate 24 on the inner side of segment 20 overlapping the end of segment 19. The three segments together make up the complete circumference or periphery of the annular drum body.

The main segment 18 is detachably secured by flush-head screws 25 to a chuck member 26 held between positioning ribs 27 cast on the inner side of the segment, said member having an arcuate outer face conforming to the complemental inner face of the segment. Rigidly fixed to said chuck members are a pair of parallel, inwardly-projecting guide stems in the form of racks 28 having gear teeth 29 formed on their adjacent or inner edges. These racks slide in a pair of guide channels 30 which are formed in the rear side of the hub flange 17 in a plane at right-angles to the axis of the shaft 11 and covered by retaining plates 31 detachably secured to the flange body by screws 32, said plates, together with the bottom and side faces of the channels, constituting the guiding surfaces. The chuck member and main segment are thus mounted for radial sliding movement with reference to the axis of shaft 11, toward and from the hub structure 15.

For collapsing and expanding the drum, I provide gearing and linkage operated by relative rotation of the hollow shaft 12, 13 on the inner shaft 11, and prefer to place the collapsing action under manual control by means of a brake-drum 33 on shaft section 13, adapted to be retarded by a stationarily mounted brake band 34 actuated by a control lever 35, as disclosed in my prior application Ser. No. 436,716, filed March 18, 1930.

Figure 2:
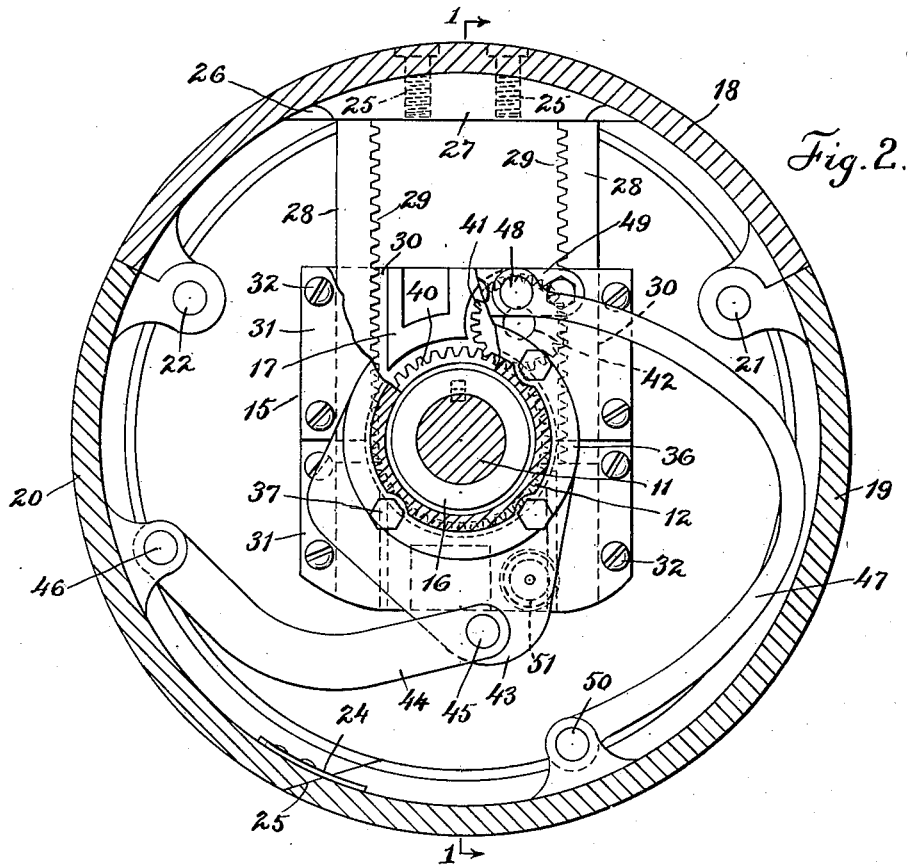
Fig. 2 is a transverse section on the line 2—2 of Fig. 1, partly broken away.

To the forward hollow shaft section 12 is welded a collar 36 secured by screws 37 to a sleeve 38 rotatable on the sleeve portion 16 of the hub structure and axially held between the flange 17 of said structure and a split retaining ring 39 mounted in a groove on said portion 16. The forward end of sleeve 38 is formed as a gear pinion 40 whose teeth mesh with those of the left-hand rack 28 as viewed in Fig. 2. An intermediate gear pinion 41 loosely mounted on a stud 42 carried by the hub structure 15 meshes with the teeth of the main pinion 40 and of the right-hand rack 28. By this arrangement of gearing the rotation of the gear 40 with reference to the central shaft 11 and to the hub structure moves both of the racks in the same direction, and the provision of two racks straddling the central shaft and guided as described on the hub structure prevents any cramping of the movements of the main segment and avoids weakening of the central shaft or location of the gearing beyond the end of said shaft.

The sleeve 38 is formed with a radial flange or plate 43 providing a toggle member to which one end of a bent link 44 is pivoted by a pin 45, the other end of the link being pivoted by a pin 46 to ears formed on the inner side of the segment 20, approximately half-way of the length of said segment. 47 is another link, bent nearly into U-shape to avoid the end of segment 20 when the drum is collapsed, said link being pivoted at one end by a pin 48 to a boss plate 49 on one of the hub plates 31 substantially on the chord between the hinge pins 21 and 22, and pivoted at its other end by a pin 50 to ears formed on the inner side of the segment 19 near the free end of the latter.

51 is a spring-projected cam latch slidingly mounted on the flange 17 of hub structure 15 and having a conical rear end adapted to enter a complemental socket in the flange plate 43 of sleeve 38 as the drum segments approach and reach their expanded condition, to aid in holding them in that condition, said latch being automatically retractible by the rotary movement of plate 43 when the drum starts to collapse. This feature is claimed in my co-pending application Ser. No. 535,455, filed May 6, 1931.

Figure 3:
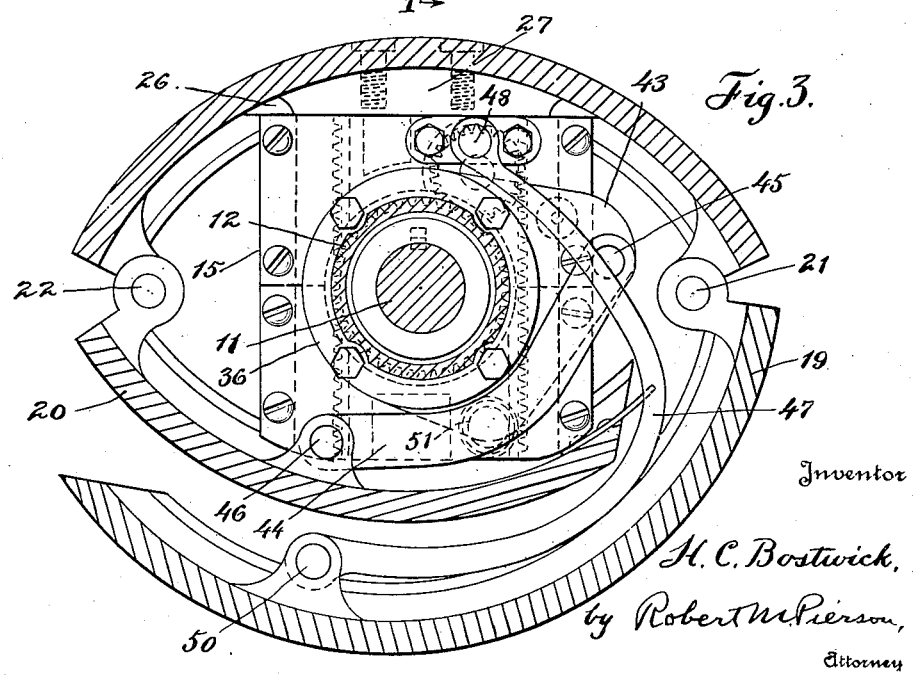
Fig. 3 is a transverse section showing the drum collapsed.

In operation, when it is desired to collapse the drum after forming a tire band thereon, this may be done while the drum is still in rotation, preferably after the power has been disconnected. The operator sets the brake band 34 against the drum 33, the hollow shaft 12, 13 and parts at the forward end thereof being thereby retarded and the drum collapsed by the power of its own momentum. The continued forward rotation of the drum, resulting in a relative backward rotation of the brake-retarded gear 40, through the action of said gear and the intermediate pinion 41 on the respective racks 28, produces an inward radial movement of the main segment 18 toward the central axis until said segment reaches the position shown in Fig. 3. At the same time, during the rotary movement of sleeve 12 around shaft 11, the link pin 45 is moved through an angle of substantially 90 degrees around said shaft to the relative position shown in Fig. 3, and the segment 40 is thereby folded inwardly against the hub structure 15. Concurrently with these actions, the segment 19 is also folded inwardly to a position overlying the segment 20 as shown in Fig. 3, by the inward movement of its hinge pin 21, resulting in an inward swinging movement of link 47 while the link pin 48 remains relatively fixed. The segments are thus collapsed in the plane of the expanded drum. By a proper apportioning of weight masses on opposite sides of the axis of shaft 11, wherein the chuck member 26, ribs 27 and associated parts may be made to counterbalance non-symmetrically placed parts on the other side, the drum structure may be substantially relieved of unbalanced centrifugal forces in both its expanded and collapsed condition. The segments easily strip away from the inner side of the tire band, which latter is more or less held out by centrifugal force, and the band may be removed when the drum is brought to rest. On restarting the shaft 11, the drum is automatically expanded by centrifugal force acting upon its segments.

It will be noted that the greatest collapsed diameter of the drum is considerably less than its expanded diameter notwithstanding only three segments are employed in the embodiment here illustrated. This is an important advantage in making relatively high-crowned tire bands of small bead diameter, and my invention provides the added advantages of simple, sturdy and durable construction and ease of operation.

It will be understood that the invention is not confined to the exact form and arrangement of parts herein illustrated and various changes could be made without departing from the scope of said invention as defined in the claims.

I claim:

1. A collapsible form comprising an inner rotary support, a main segment mounted thereon and movable as a whole toward and from the axis of rotation, and foldable segments carried by said main segment and collapsible therewith in the plane of the expanded form.

2. A collapsible form comprising a hub structure, a main segment guided thereon for sliding movement toward and from the latter in the plane of the expanded form, and a foldable segment pivoted to said main segment and movable thereon in said plane.

3. A collapsible form expansible by centrifugal force and comprising a hub structure, a main segment slidably mounted thereon for movement toward and from the latter, and a pair of additional segments pivoted to opposite ends of said main segment and adapted to fold one over the other in the collapsed condition of the form, the masses of said parts when collapsed being substantially in rotational balance.

4. A collapsible form comprising a hub structure apertured to receive a supporting shaft and having guides on opposite sides of the aperture in a plane at right angles to the axis of the shaft aperture, a main segment having members slidable in said guides, and a foldable segment pivoted to said main segment.

5. A collapsible form comprising a hub structure appertured to receive a supporting shaft and having a pair of guides on opposite sides of its aperture in a plane at right angles to the axis of the shaft aperture, a main segment having a pair of gear racks slidable in said guides, gearing on said hub structure engaging the racks, and an additional segment foldably supported on said main segment.

6. A chuck for collapsible forms comprising a hub structure having a pair of guides, a main segment support having a pair of racks slidable in said guides and provided with teeth on their inner edges, a main gear pinion rotatable on said hub structure between the racks and meshing with one of the racks, and an intermediate gear pinion rotatable on the hub structure and connecting said main gear pinion with the other rack.

7. A collapsible form comprising a hub structure, and a series of segments coacting in expanded relation to constitute an annular form and all movable with respect to said hub structure in the plane of the expanded form, toward and from the latter, said segments including a bodily-movable main segment and a plurality of additional segments foldably carried thereby.

8. A collapsible form comprising a hub structure, a main segment slidable thereon, a foldable segment pivoted to said main segment, and means for concurrently moving said segments toward the hub structure to collapse the form.

9. A collapsible form comprising an inner rotary support, a main segment radially slidable thereon, gearing for sliding said segment, a foldable segment carried by said main segment, and means inter-connected with said gearing for collapsing said foldable segment concurrently with the inward movement of the main segment.

10. A collapsible form comprising a rotary hub structure, a main segment radially slidable thereon, foldable segments pivoted to opposite ends of said main segment, means rotatable on said hub structure for concurrently imparting collapsing movements to the main segment and one of the pivoted segments, and means connecting said hub structure with the other pivoted segment for collapsing the latter.

11. A collapsible rotary form comprising a rotary hub structure, a main segment radially slidable thereon, gearing including a gear rotatable on said hub structure concentric with the latter's axis of rotation for sliding said main segment and having a toggle member, and a foldable segment pivotally carried by said main segment and linked to said toggle member.

12. A collapsible form comprising a rotary hub structure, a main segment radially slidable thereon, a foldable segment pivoted to said main segment and linked to the hub structure, a second foldable segment pivoted to the main segment, a controlling member rotatable on said hub structure and linked to said second foldable segment, and gearing connecting said controlling member with the main segment.

13. A collapsible form comprising a rotary hub structure, a main segment radially slidable thereon and having a pair of gear racks, a foldable segment pivoted to one end of said main segment, a link connecting said foldable segment with the hub structure, a second foldable segment pivoted to the opposite end of said main segment and adapted to lie within the first-said foldable segment in the collapsed condition of the form, a controlling member rotatable on the hub structure concentric with the latter's axis of rotation and having a concentric gear meshing with one of said racks, an intermediate pinion connecting said gear with the other rack, and a link connecting said controlling member with the second said foldable segment.

14. A collapsible form comprising a rotary main shaft, a hub structure thereon, a main segment radially slidable on said hub structure, foldable segments pivoted to said main segment, and a hollow shaft surrounding and rotatable with respect to said main shaft and having connections with said main and foldable segments for concurrently imparting collapsing movements thereto.

15. A collapsible band-forming drum comprising a rotary hub structure, a main segment radially slidable thereon, and a pair of foldable drum segments pivoted to opposite ends of said main segment and forming together therewith the entire periphery of said drum.

In witness whereof I have hereunto set my hand this 16th day of June, 1931.

HENRY C. BOSTWICK.